United States Patent
Medovich et al.

(10) Patent No.: US 10,572,393 B2
(45) Date of Patent: Feb. 25, 2020

(54) OBJECT MEMORY MANAGEMENT UNIT

(71) Applicant: ColorTokens, Inc., Santa Clara, CA (US)

(72) Inventors: Mark Medovich, Fort Myers, FL (US); Rajesh Parekh, Los Altos, CA (US); Bharat Sastri, Pleasanton, CA (US)

(73) Assignee: COLORTOKENS, INC. CA (US)

( * ) Notice: Subject to any disclaimer, the term of this patent is extended or adjusted under 35 U.S.C. 154(b) by 334 days.

(21) Appl. No.: 15/164,558

(22) Filed: May 25, 2016

(65) Prior Publication Data

US 2016/0314079 A1 Oct. 27, 2016

Related U.S. Application Data

(63) Continuation-in-part of application No. 15/134,053, filed on Apr. 20, 2016.

(60) Provisional application No. 62/151,045, filed on Apr. 22, 2015.

(51) Int. Cl.
  *G06F 12/00* (2006.01)
  *G06F 12/1072* (2016.01)
  *H04L 29/08* (2006.01)
  *H04L 29/06* (2006.01)

(52) U.S. Cl.
  CPC ...... *G06F 12/1072* (2013.01); *H04L 63/0876* (2013.01); *H04L 67/02* (2013.01); *H04L 67/10* (2013.01)

(58) Field of Classification Search
  CPC ..... G06F 12/1072; H04L 67/10; H04L 67/02; H04L 63/0876
  See application file for complete search history.

(56) References Cited

U.S. PATENT DOCUMENTS

| | | | | |
|---|---|---|---|---|
| 6,049,808 A | * | 4/2000 | Talluri | G06F 12/0284 |
| 2007/0143542 A1 | * | 6/2007 | Watanabe | G06F 3/0634 |
| | | | | 711/114 |
| 2009/0287902 A1 | * | 11/2009 | Fullerton | G06F 12/1036 |
| | | | | 711/206 |
| 2010/0312850 A1 | * | 12/2010 | Deshpande | G06F 12/1009 |
| | | | | 709/216 |
| 2011/0060883 A1 | * | 3/2011 | Otani | G06F 3/0605 |
| | | | | 711/162 |
| 2015/0378641 A1 | * | 12/2015 | Franke | G06F 3/0664 |
| | | | | 710/74 |

* cited by examiner

*Primary Examiner* — Kalpit Parikh
(74) *Attorney, Agent, or Firm* — Barry Choobin; Patent 360 LLC

(57) ABSTRACT

Techniques to facilitate enhanced addressing of local and network resources from a computing system are provided herein. In one implementation, a method of configuring an object memory management unit (OMMU) for a computing system includes transferring a request to at least one network configuration resource for OMMU configuration information, and receiving the OMMU configuration information from the at least one network resource. The method further comprises, based on the OMMU configuration information, generating a mapping of virtual addresses in the computing system to local addresses that address local resource of the computing system and network addresses that address network resources external to the computing system over at least a network.

9 Claims, 10 Drawing Sheets

OBJECT MEMORY MANAGEMENT UNIT

RELATED APPLICATIONS

This application is a continuation-in-part of U.S. patent application Ser. No. 15/134,053, entitled "OBJECT MEMORY MANAGEMENT UNIT", filed Apr. 20, 2016, which claims the benefit of, and priority to, U.S. Provisional Patent Application No. 62/151,045, entitled "OBJECT MEMORY MANAGEMENT UNIT", filed Apr. 22, 2015, which are hereby incorporated by reference in their entirety for all purposes.

TECHNICAL FIELD

Aspects of the disclosure are related to computing hardware and software technology, and in particular to computer architecture, cloud computing, and virtualization technology.

TECHNICAL BACKGROUND

Today, computing is increasingly being delivered as a utility service over the Internet. Through the deployment of cloud computing and virtualization technology, compute, storage, and application services are available for on-demand consumption over the Internet. In this model of delivery, a user is not required to have knowledge of the physical locations and the configurations of the compute and storage resources in order to utilize the service.

End users of cloud computing often organize the resources available into "hybrid clouds" that comprise "private clouds" that include servers and storage systems at a private data center, and also "public clouds" that include servers and storage systems located at multi-tenant public data centers such as Amazon Web Services, Google Compute Engine, or Microsoft Azure. These clouds use virtualization technology such as those offered by VMWare ESX or KVM to group computing resources for easy management. End users may also create cloud groups based on workload requirements for various end-user groups.

The existing methodology to create these groups requires manual assignment, typically by a cloud service provider, of the necessary compute, storage, network, and Internet resources. In fact, to enable easy consumption of services and resources by the compute node, the complexity of deploying and configuring the network topology and the available compute, storage, and network resources is typically handled by the cloud service provider. The sheer number of network devices and tools make it very onerous and inefficient for systems administrators at the service provider to deploy cloud resources that can deliver a level of performance that is guaranteed via a contractual obligation.

The fundamental reason for this problem results from the fact that the basic monolithic building block needed to build the cloud is a "motherboard". In its most basic implementation, this "motherboard" is typically comprised of a CPU, memory, and a network interface controller (NIC) connected together on a circuit board. Each "motherboard" on a network may be identified by a physical or virtual internet protocol (IP) address, or a physical media access control (MAC) address embedded in the NIC device. This "motherboard" may be implemented in a plurality of ways including but not limited to personal computer (PC) motherboards and blade server plug-in boards, multiples of which are required to build large servers as is common in the cloud. These "motherboards" are then used to deploy operating systems, which in turn allow the deployment of virtualization technology in the form of virtual machines (VMs) and virtual networks to create the end cloud product that supports guest operating systems, thereby enabling the consumption of computing resources as a service. In order to achieve this virtualization, the user that is creating the cloud resources typically needs to know the IP addresses of all of the computing, storage, and Internet resources needed to be connected together. Consequently, it is very problematic to create the cloud groups that provide the necessary resources to deliver the level of service required to handle the user workloads efficiently.

OVERVIEW

Provided herein are systems, methods, and software to enhance addressing of local and network resources for a computing system. In one implementation, a method of configuring an object memory management unit (OMMU) for a computing system includes transferring a request to at least one network configuration resource for OMMU configuration information, and receiving the OMMU configuration information from the at least one network resource. The method further comprises, based on the OMMU configuration information, generating a mapping of virtual addresses in the computing system to local addresses that address local resource of the computing system and network addresses that address network resources external to the computing system over at least a network.

In some implementations, the network addresses comprise Uniform Resource Identifiers (URIs).

In some implementations, the local resources comprise disk storage and dynamic random-access memory (DRAM).

In some implementations, prior to transferring the request to at least one network configuration resource, the method includes transferring a first request to an authentication server for network configuration resources, and receiving access information from the authentication server for at least one network configuration resource. In at least one implementation, the first request may include credentials associated with the hardware of the computing system or the user of the computing system.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
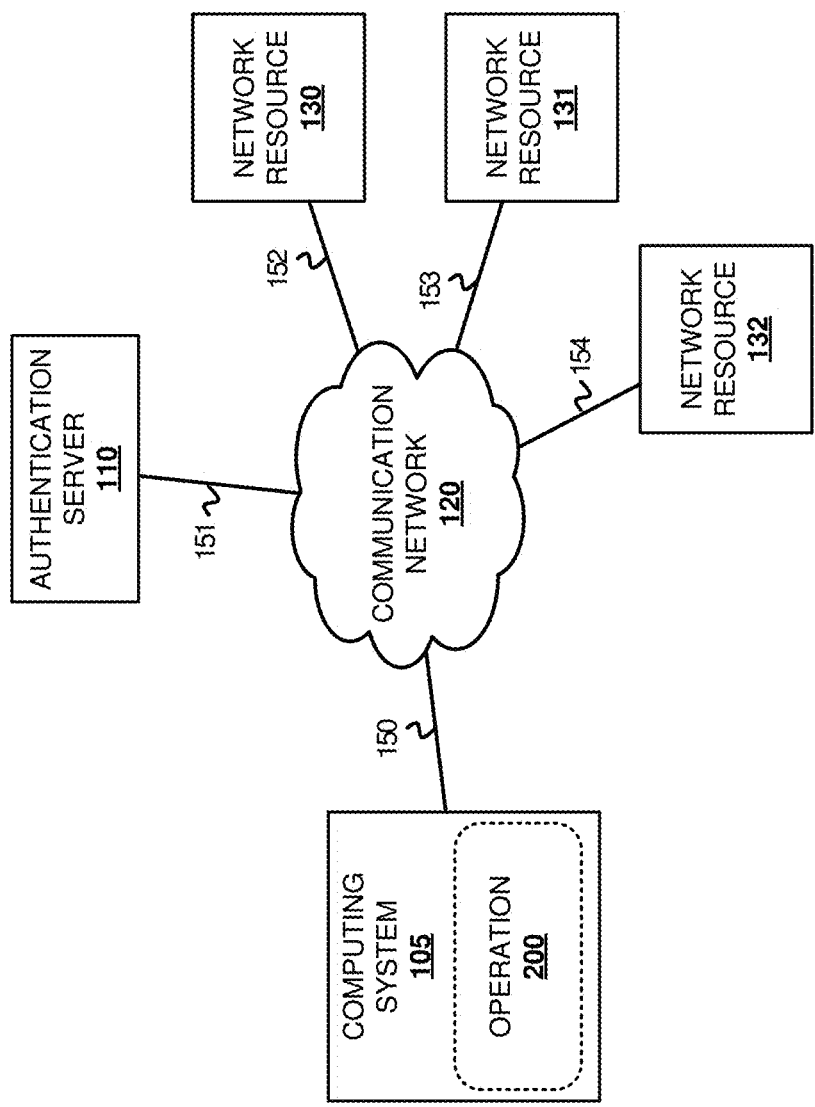
FIG. 1 illustrates a communication network for configuring an object memory management unit according to one implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The following discussion presents techniques to federate or unify a plurality of physical and virtual compute, storage, and Internet resources and make them available as a local resource to any compute node. The techniques provide on-demand deployment and presentation of a compute resource that incorporates discrete physical and virtual compute, storage, and Internet resources available both locally or in the cloud as a unified local compute resource to a user.

In at least one implementation, a plurality of compute infrastructures may be deployed, dynamically federated from a plurality of available discrete physical and virtual compute, storage, and Internet resources, whether they are local or available in the cloud, as a single unified local resource to execute a plurality of workloads. This may be accomplished through the use of an object memory management unit (OMMU). In some implementations, the OMMU can provide a computer with the ability to map all of the authorized compute, storage, and Internet resources available to execute its workload, regardless of whether the resource is a physical resource such as a central processing unit (CPU) implemented on a computer motherboard, or virtual such as a virtual machine (VM), local or in the cloud, into a single unified local physical resource that can execute a plurality of workloads. The OMMU may be implemented as a software program executing on a computer or a virtual machine to provide this memory mapping functionality for both a physical machine as well as a virtual machine. Further, the OMMU may also be implemented as a functional block in one or more silicon devices, including but not restricted to, commercial CPU devices such as those from companies like Intel, AMD, ARM, discrete Memory Management Unit VLSI, Motherboard VLSI chipsets, and other devices typically used to implement a computer motherboard.

The present disclosure describes a novel apparatus and method that enables the deployment and federation of compute, storage, and Internet resources regardless of where they might exist physically, and presents the federated resources as a single unified local resource under program code control. In at least one implementation, a federated cloud computing resource may be created on-demand that is controlled by a software program. The creation of this federated cloud computing resource involves the use of a "bootstrap" protocol such as, but not limited to, PXE (Pre-eXecution Environment as implemented by Intel Corporation) for the user's "motherboard," and the implementation of a resource and memory mapping apparatus called an Object Memory Management Unit (OMMU) in the firmware or the CPU silicon of the "motherboard." This OMMU apparatus and its operation will be described later in detail below.

Conventionally, a bootstrap protocol such as PXE allows a "motherboard" to boot-up under program control in a predetermined sequence. A sequence of program instructions identifies local resources available to the CPU such as memory, network interfaces, and other components available on the motherboard, initialize their state, and finally load and execute the operating system and all the necessary services such as TCP/IP internetworking to get the "motherboard" ready for use.

The present disclosure provides an enhanced bootstrap technique that utilizes the OMMU apparatus to create a virtual memory system that provides a virtual address to physical address translation that maps not only local motherboard devices as outlined above but also a plurality of network, Internet, or cloud (compute, storage, and other Internet) resources commonly referred to by those skilled in the art as universal resource identifiers (URIs). This enhanced bootstrap technique employing the OMMU results in an inventory of URI resources that appear as local resources, which in turn allows the "motherboard" to bootstrap with a much expanded capability by incorporating these network, Internet and cloud resources, referred to as universal resource identifiers (URIs), as a single unified local resource.

In addition to providing a mechanism to translate or map the local "motherboard" virtual address space to a local physical address space that incorporates main memory and disk storage as the media to define virtual storage, it expands the virtual address space to include a universal resource address space (URAS) into the virtual memory of the local system. In turn, the bootstrap code will also identify and deploy desired and authorized individual Internet resources, known as universal resource identifiers (URIs), and map them into the local system's physical address space. For example, in one embodiment, an inventory of pre-authorized URIs may be downloaded and cached in the system main memory, managed by the OMMU apparatus, and may be updated dynamically under program control.

The OMMU apparatus provides a mechanism to map or translate an expanded virtual address space that incorporates the universal resource address space to a local physical address space in a manner similar to that of a conventional memory management unit (MMU) implemented in CPU silicon. A PXE or similar bootstrap protocol in conjunction with the OMMU apparatus enables the federation and presentation of a plurality of compute, storage, network, and Internet resources (URIs) as a single unified local physical resource to the local system compute node as the end result of the boot process. The OMMU may use the universal address space as a trust repository, e.g. a cache of private keys that enable the encryption and decryption of URIs, object table entries in the OMMU, file read/write operations, and others.

In at least one exemplary embodiment, a plurality of systems implementations could comprise combinations of "motherboard" hardware running operating systems such as Microsoft Windows, Linux, OSX, and the like, and network protocols such as hypertext transfer protocol (HTTP) using representational state transfer (ReST) protocols. Another exemplary embodiment could comprise a stand-alone computer program executing on a physical computer system or a virtual machine (VM) either locally, or on a remote computing system, or on a virtual machine in the cloud, or at both clients and servers simultaneously. In yet another embodiment, an individual user could utilize a computing system, either physical or virtual, comprising an OMMU to unify all of the user's resources and devices as a single local resource of the computing system, which could include local, on-premise resources, such as a local network attached storage (NAS) drive on a private, lower-layer cloud, in addition to compute, storage, and network resources (URIs) available to the user over Internet.

Most computing systems support the notion of virtual memory. Virtual memory plays a key role in the design of hardware exceptions, assemblers, linkers, loaders, shared objects, tiles, and processes. Virtual Memory makes it possible to read or modify the contents of a disk file by reading or writing memory locations. It also permits loading or transferring of the contents of a file into memory without performing an explicit copy operation.

To understand the leverage that virtual memory provides, we first define the concept of an address space. An address space is an ordered set of nonnegative integer addresses (i.e. 0, 1, 2 . . . N). If the integers in the address space are consecutive, then we say that it is a linear address space or LAS. A basic computer system has a physical address space or PAS that corresponds to the M bytes of physical memory in the system i.e. 0, 1, 2 . . . M−1).

The concept of an address space makes a clean distinction between data objects (e.g. bytes) and their attributes (e.g. addresses). Accordingly, it allows each object to have multiple independent addresses, each chosen from a different address space. Thus, each byte of main memory has a virtual address chosen from a virtual address space and a physical address chosen from a physical address space.

In a system with virtual memory, the CPU generates virtual addresses from an address space of $N=2^n$ addresses called the virtual address space or VAS: $\{0, 1, 2 \ldots N-1\}$. The size of an address space is characterized by the number of bits that are needed to represent the largest address. For example, a virtual address space with $N=2^n$ addresses is called an n-bit address space. Modern systems typically support either 32-bit or 64-bit virtual address spaces.

Virtual memory provides three important capabilities:

(1) it uses main memory efficiently by treating it as a cache for an address space stored on disk, keeping only the active areas in main memory, and transferring data back and forth between local storage disk and physical memory as needed.

(2) It simplifies memory management by providing each process with a uniform address space.

(3) It protects the address space of each process from corruption by other processes.

Virtual address space varies according to the system's architecture and operating system. Virtual address space depends on the architecture of the system because it is the architecture that defines how many bits are available for addressing purposes. Virtual address space also depends on the operating system because the manner in which the operating system is implemented may introduce additional limits over and above those imposed by the architecture.

Formally, address translation is a mapping between the elements of an N-element virtual address space (VAS) and an M-element physical address space (PAS) and is defined as:

$$\text{MAP: VAS} \rightarrow \text{PAS} \cup \emptyset$$

Where

MAP (A)=A', if data at virtual address A in VAS is present at physical address A' in PAS (also called a page hit);

Else

MAP (A)=∅, if data at virtual address A in VAS is not present in physical memory (also called a page miss).

The terms "page hit" and "page miss" are terms that are familiar to those skilled in the art. Those skilled in the art are also aware that to support the translation of virtual addresses to physical address on the fly, special memory management hardware known as a MMU (Memory Management Unit) is implemented in the Central Processing Unit (CPU).

Referring now to FIG. 1, FIG. 1 illustrates a communication network 100 for configuring an object memory management unit according to one implementation. Communication network 100 includes computing system 105, authentication server 110, communication network 120, and network resources 130-132. Authentication server 110 and network resources 130-132 may may each comprise physical host computing systems, virtual machines, containers, or some combination thereof. Network resources 130-132 are examples of network configuration resources capable of configuring an OMMU of a computing system. Computing system 105, authorization server 110, and network resources 130-132 communicate with communication network 120 via communication links 150-154.

In operation, computing system 105 performs configuration operation 200 to configure a OMMU for computing system 105. This OMMU may be implemented as a process executing on the main processing system for computing system 105 or may be implemented as a separate hardware and software controller on computing system 105 separate from the main processing system. In particular, the OMMU permits computing system 105 to generate and maintain a mapping of virtual addresses for computing system 105 to local addresses that address local resources of the computing system and network addresses that address network resources external to the computing system over at least communication network 120. This mapping permits an expansion in the storage space of computing system 105 outside of the local storage, such as solid state drives, hard disk drives, dynamic random access memory (DRAM), or some other local storage device to computing system 105.

In at least one implementation, the OMMU receives a request for a resource using the virtual addresses. In response to the request, the OMMU translates the request into either a local address or a network address, and accesses the requested data using the corresponding local or network address. In the case of a network address, which may comprise a URI or a URL, the OMMU may apply an HTTP or HTTPS command to access the required data and perform the desired operation. This desired operation may include a write command, a read command, or any other similar operation to the data at the network address. For example, if a process of computing system 105 requested a page read from a network address, the page data may be retrieved for the process using the required HTTPS command.

Figure 2:
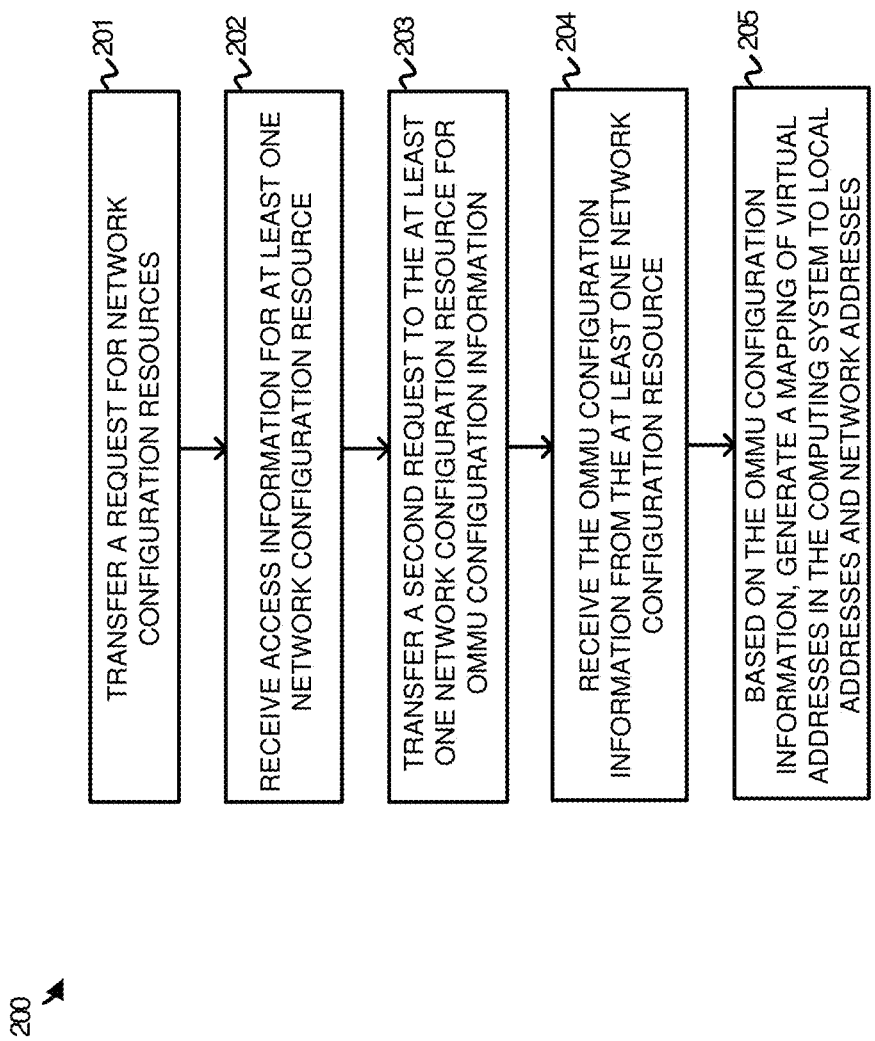
FIG. 2 illustrates an operation of configuring an object memory management unit according to one implementation.

To further demonstrate the configuration of computing system 105, FIG. 2 is provided. FIG. 2 illustrates an operation 200 of configuring an OMMU according to one implementation. The processes of operation 200 are referenced parenthetically in the paragraphs that follow, along with references to the elements and systems from communication system 100 of FIG. 1.

As depicted, operation 200 includes transferring a request for network configuration resources to authentication server 110 (201). In some implementations, this request may include credentials for computing system 105, wherein the credentials may include hardware identifier information for computing system 105 and/or user credentials associated with a user of computing system 105. In at least one example, to transfer the request to authentication server 110, computing system 105 may provide a prompt and receive credentials from a user of computing system 105. These credentials may include a username, a password, an authentication code, or some other similar information to identify the user of computing system 105. Once the credentials are received, the request may be transferred to authentication server 110. In some examples, computing system 105 may be provided or configured with an IP address for authentication server 110, permitting computing system 105 to communicate with authentication server 110.

Once the request is transferred, operation 200 further directs computing system 105 to receive access information for at least one network configuration resource from authentication server 110 (202). This access information permits computing system 105 to address and receive configuration information from a network resource in network resources 130-132. In particular, the access information may include, but is not limited to, an address for at least one of the network resources, a security key or phrase for at least one network resource, or some other similar access information for the network resource.

After the access information is received for the network resource, operation 200 directs computing system 105 to transfer a second request to the at least one network configuration resource for OMMU configuration information (203). As an illustrative example, authentication server 110 may provide computing system 105 with access information for network resource 130. Once the access information is received, computing system 105 may transfer a second request to network resource 130, requesting configuration information for the OMMU of computing system 105. In response to the request, the network configuration resource identifies the required OMMU configuration information and transfers the information to computing system 105. Computing system 105 receives the OMMU configuration information from the at least one network configuration resource (204) and based on the configuration information, generates a mapping of virtual addresses for the computing system to local addresses and network addresses (205). This mapping of the virtual addresses to local and network addresses permits processing system of the computing system to address local resources, such as hard disk drives and solid state drives, and network resources, such as server storage in network resources 130-132, using the same addressing scheme. Once the the mapping is generated for the virtual addresses, computing system 105 may be initialized and use virtual addressing space to access required pages locally and over the network.

In at least one implementation, a process executing on the processing system of computing system 105 may request resources using virtual addresses of the virtual address space. In response to the requests, the OMMU will identify the requests and translate the virtual addresses into their corresponding local addresses or network addresses. Once translated, the resource for the requested data may be accessed using the local addresses and network addresses, and provided to the processing system as required.

In some implementations, the configuration information obtained from the network resource may include data to be stored in the local resources of computing system 105. This data may include at least a portion of an operating system in some examples, and my further include files, applications, or any other similar data allocated to the computing system. This data may then be mapped between the virtual addressing space and the local addressing space, such that the data may be accessed by the processing system of computing system 105. In some implementations, the configuration information may include executable program instructions or code that can be executed by the processing system of computing system 105 to generate the mapping of the virtual addresses to the local addresses and network addresses. Once the configuration program instructions are executed to generate the mapping, processes may be initiated on the computing system, wherein the initiated processes use the mapping to access both local and network resources. For example, an operating system may request a page at a particular virtual address. In response to the request, the OMMU may be used to translate the virtual address into a local address or a network address, and access the required data to provide the data for processing.

Figure 3:
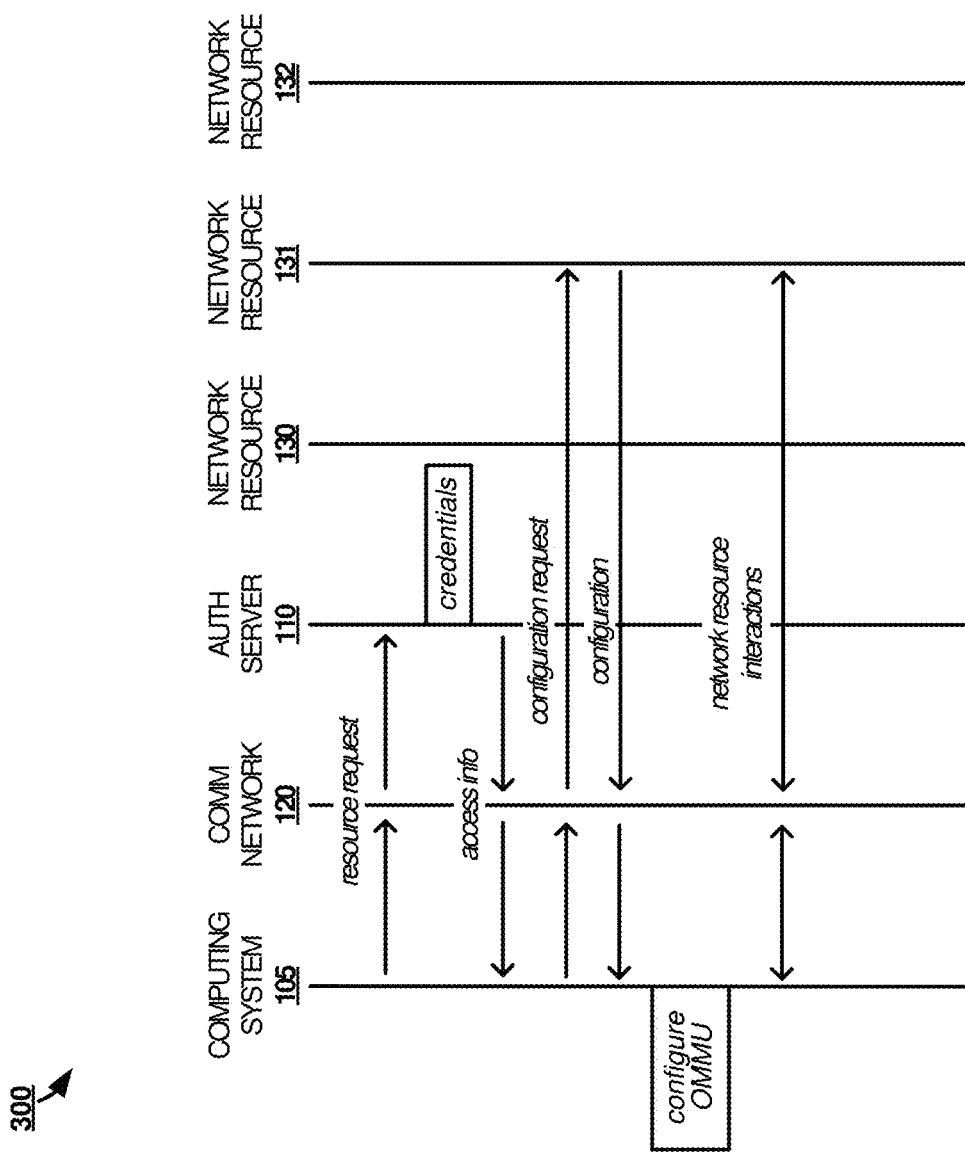
FIG. 3 illustrates a timing diagram of configuring an object memory management unit according to one implementation.

FIG. 3 illustrates a timing diagram 300 of configuring an object memory management unit according to one implementation. Timing diagram 300 includes references to the elements and systems from communication system 100 of FIG. 1.

As illustrated in timing diagram 300, computing system 105 transfers a resource request to authentication server 110. This authentication request may be generated when computing system 105 is first powered on, when computing system 105 identifies an available communication network, or at any other similar instance. In some implementations, this resource request may include credentials associated with computing system 105. These credentials may include, but are not limited to, a device identifier for computing system 105, a user identifier for a user of computing system 105, a security password, a license key, or some other similar credential for computing system 105, including combinations thereof. To communicate with authentication server 110, computing system 105 may be configured with a bootstrap application to initiate the configuration of the OMMU and addressing information for authentication server 110. This addressing information for authentication server 110 may include an IP address of authentication server 110, a passphrase to access authentication server 110, or any other similar addressing information for communicating with authentication server 110 over communication network 120.

In response to the resource request, authentication server 110 processes the credentials supplied by computing system 105 to determine what, if any, network resources should be provided to computing system 105. These resources include network resources, such as physical or virtual servers capable of configuring the OMMU of computing system 105. Once the network resources are identified for computing system 105, authentication server provides access information for the network resources available to computing system 105, wherein the access information may include IP addressing information for the available resource as well as credentials to access the data on the resource.

In the present implementation, authentication server 110 identifies that network resource 131 should be used to configure the OMMU for computing system 105, and provides access information for network resource 131. Responsive to receiving the access information for network resource 131, computing system 105 may transfer a configuration request over communication network 120 to retrieve a configuration for a OMMU on computing system 105. Upon receiving the configuration from network resource 131, computing system 105 configures the OMMU for the device, wherein configuring the OMMU comprises generating a mapping of virtual addresses in the computing system to local addresses that address local resources of the computing system and network addresses that address network resources external to the computing system over at least communication network 120.

By configuring the OMMU to address both local addresses and network addresses, the computing system may not be required to store all required data for processes and applications on local storage for the device. In particular, rather than storing portions of the operating software for computing system 105 locally, such as in hard disk storage or solid state storage, the operating software may be stored in an external server resource, such as network resource 131. Accordingly, when a virtual address is requested by a process executing on computing system 105, rather than providing the resource at the virtual address from a local storage resource, the OMMU may translate the request into a URI or URL associated with the request, and transfer the request over the network using an HTTPS or some other similar network command. Here, in operational scenario 300, the OMMU is configured such that the virtual addresses further address resources in network resource 131, wherein the resources may be pages of data or some other similar storage resource. As a result of the configuration, when computing system 105 generates a write request or a read request to a virtual address that is not stored in local storage for computing system 105, the request is translated into the network URI address and the appropriate write, read, copy, or any other similar command is applied to the page located at the URI location. In some implementations, to access the data from network resource 131, computing system 105 may apply HTTPS commands to provide the appropriate access operations to the data located at the URI address. Although illustrated as communicating with network resource 131 to access resources over communication network 120, it should be understood that other network resources, such as network resources 130 and 132, may also contain resources addressable via URIs.

In some implementations, in providing the configuration information to computing system 105, network resource 131 may further provide data to be stored in local storage of the computing system. Consequently, in generating the mapping of the virtual addresses to the local and network addresses, computing system 105 may generate a mapping between virtual addresses and local addresses for the data as it is stored in a storage system on the computing system. In some examples, this data may include at least a portion of an operating system for computing system 105, such as Linux, Microsoft Windows, and the like.

Figure 4:
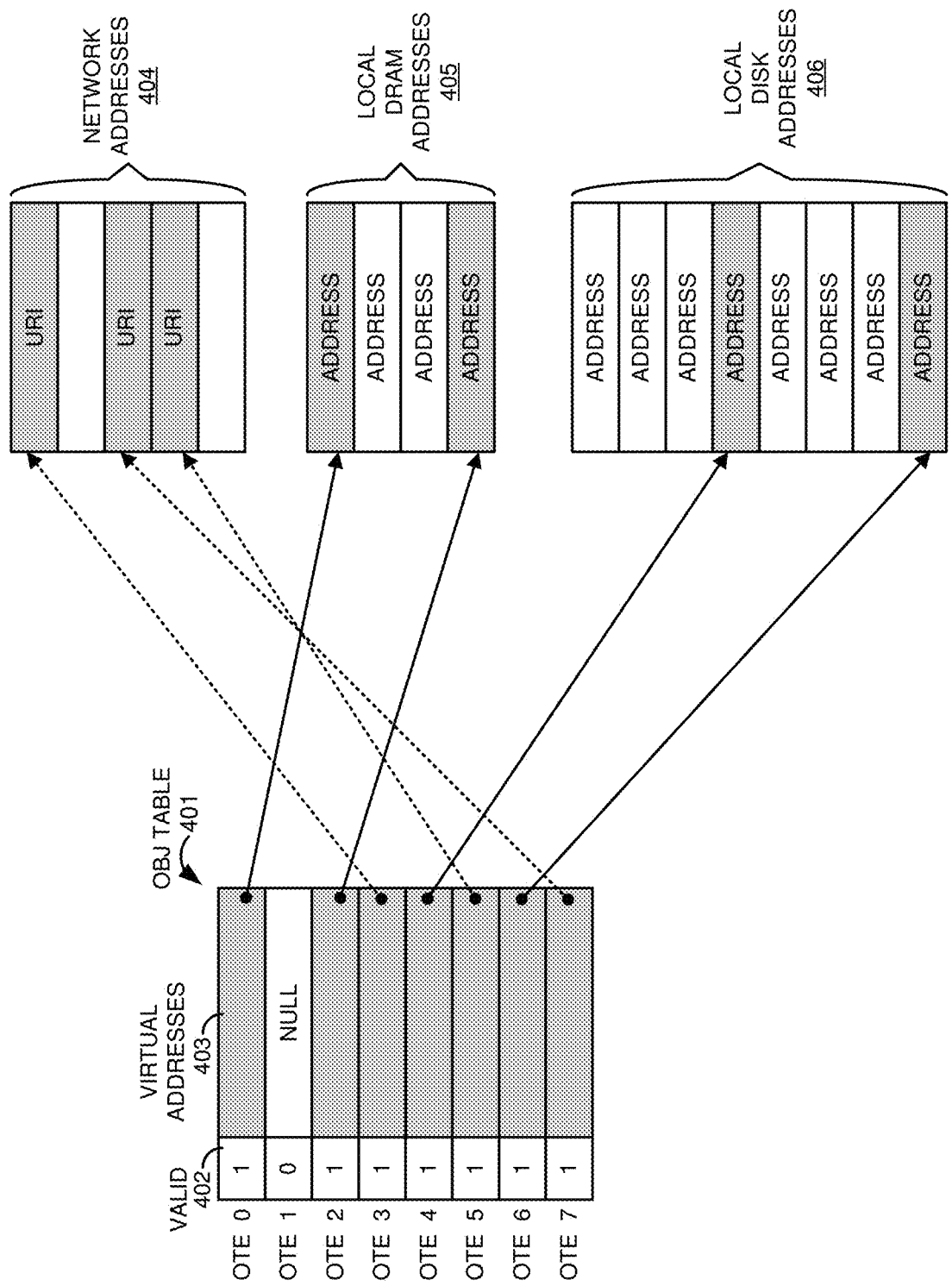
FIG. 4 illustrates address mapping for an object memory management unit according to one implementation.

FIG. 4 illustrates address mapping for an object memory management unit according to one implementation. FIG. 4 includes an object table 401, network addresses 404, local DRAM addresses 405, and local disk addresses 406. Object table 401 further includes valid bits 402 and virtual addresses 403, which are mapped to network addresses 404 local DRAM addresses 405, and local disk addresses 406.

As described herein, a computing system may retrieve OMMU configuration parameters from at least one network resource, wherein the OMMU configuration parameters are used to generate a mapping between virtual addresses for the computing system and local and network resources for the computing system. Once the mapping is generated, the computing system may be initialized to use the virtual addresses in providing the proper operation of the computing system, while the OMMU translates the virtual addresses in the virtual addressing space to physical addresses in the network and local addressing space.

During the operation of the computing system, processes executing on the computing system, including operating system functionality, may generate data requests using the virtual addressing space provided by the OMMU. In response to the requests, object table 401 may be used to map the virtual addresses to their corresponding physical destination address. For example, if an address for object table entry 6 were provided, then the OMMU may translate the request to a local disk address in local disk addresses 406. In contrast, if a data request from a process on the computing system requested data from an address at OTE 3, then object table 401 may be used to translate the virtual address to a URI address in network addresses 404.

Once the virtual address is translated, either to a local address or a network address, then the appropriate operation is performed with respect to the data at the address. This operation may include a read request, a write request, a copy request, or some other similar request. Using the example of a read request, the OMMU may retrieve the data, at the local or network address and provide the data to the processing system of the computing system. Further, in some implementations and if not already placed in local DRAM storage, the OMMU may place the data within local DRAM storage and update any required mapping information to indicate that the data is cached locally on the device.

In some examples, in addition to mapping virtual addresses to network addresses, a OMMU may also maintain access information for the various network addresses. This access information may include credentials for accessing a particular network resource or URI, encryption information for retrieving encrypted data from the network resource, or any other similar information for accessing data from network resources using URI addresses.

Figure 5:
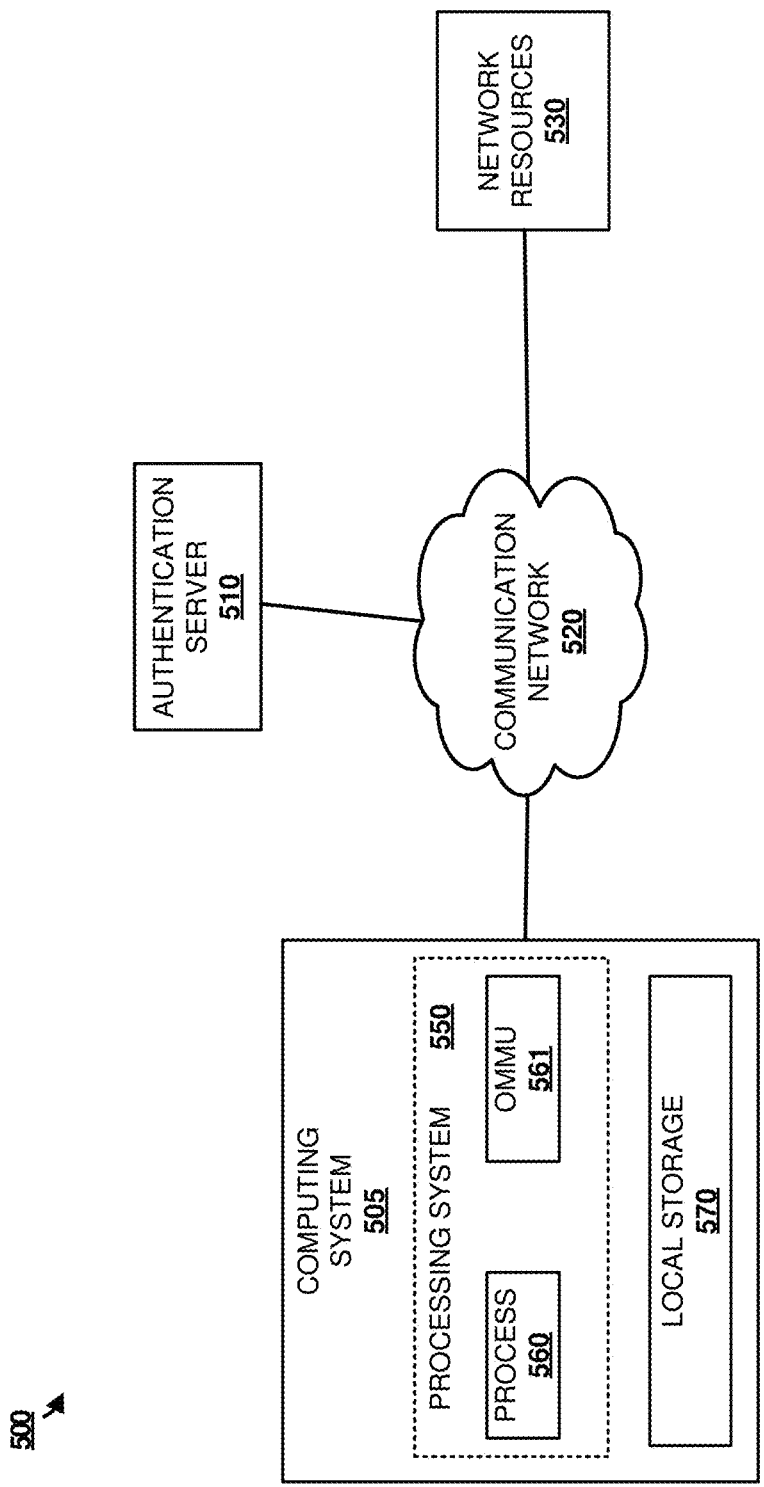
FIG. 5 illustrates a communication system for using local and network resources according to one implementation.

Referring now to FIG. 5, FIG. 5 illustrates a communication system 500 for using local and network resources according to one implementation. Communication system 500 further includes computing system 505, communication network 520, authentication server 510, and network resources 530. Network resources 530 are representative of physical or virtual computing systems capable of providing configuration information and storage resources to computing system 505. The configuration information may include OMMU configuration information, operating system data, applications, or other data for computing system 505. Authentication server 510 is representative of a virtual or physical computing node capable of checking credentials of computing system 505 and/or the user of computing system 505. Computing system 505 may comprise a virtual computing system executing via a host computer, but may also comprise physical computer in some implementations.

In operation, computing system 505 and processing system 550 executes process 560 and OMMU 561. OMMU 561 comprises a process capable of identifying data requests from other processes on computing system 505 using virtual addresses, such as process 560, and translating the requests into local or network storage addresses. To generate the mapping between the virtual addresses and the local and network addresses, computing system 505 may, upon initial startup, provide credentials to authentication server 510 to verify the user and/or hardware of computing system 505. Once the credentials are received, authentication server 510 may provide access information to computing system 505, permitting computing system 505 to communicate with network resources 530 to retrieve at least an OMMU configuration. This OMMU configuration permits computing system 505 to generate a mapping of a virtual addresses, used by other processes on computing system 505, to local addresses for local storage 570 and network addresses for network storage resources in network resources 530. These local and network resources may include an operating system and one or more applications to be executed on computing system 505. In some implementations, the configuration information may include executable program instructions or code that can be executed by the processing system of computing system 505 to generate the mapping of the virtual addresses to the local addresses and network addresses.

In at least one implementation, once the OMMU is configured, computing system 105 may initiate at least one process or operating system on processing system 505, wherein the at least one process or operating system uses the virtual addressing space for data operations. Thus, using the example of computing system 505, process 560 may be initiated on processing system 550, wherein process 560 will be provided with, and use, the virtual addresses for future data requests.

Figure 6:
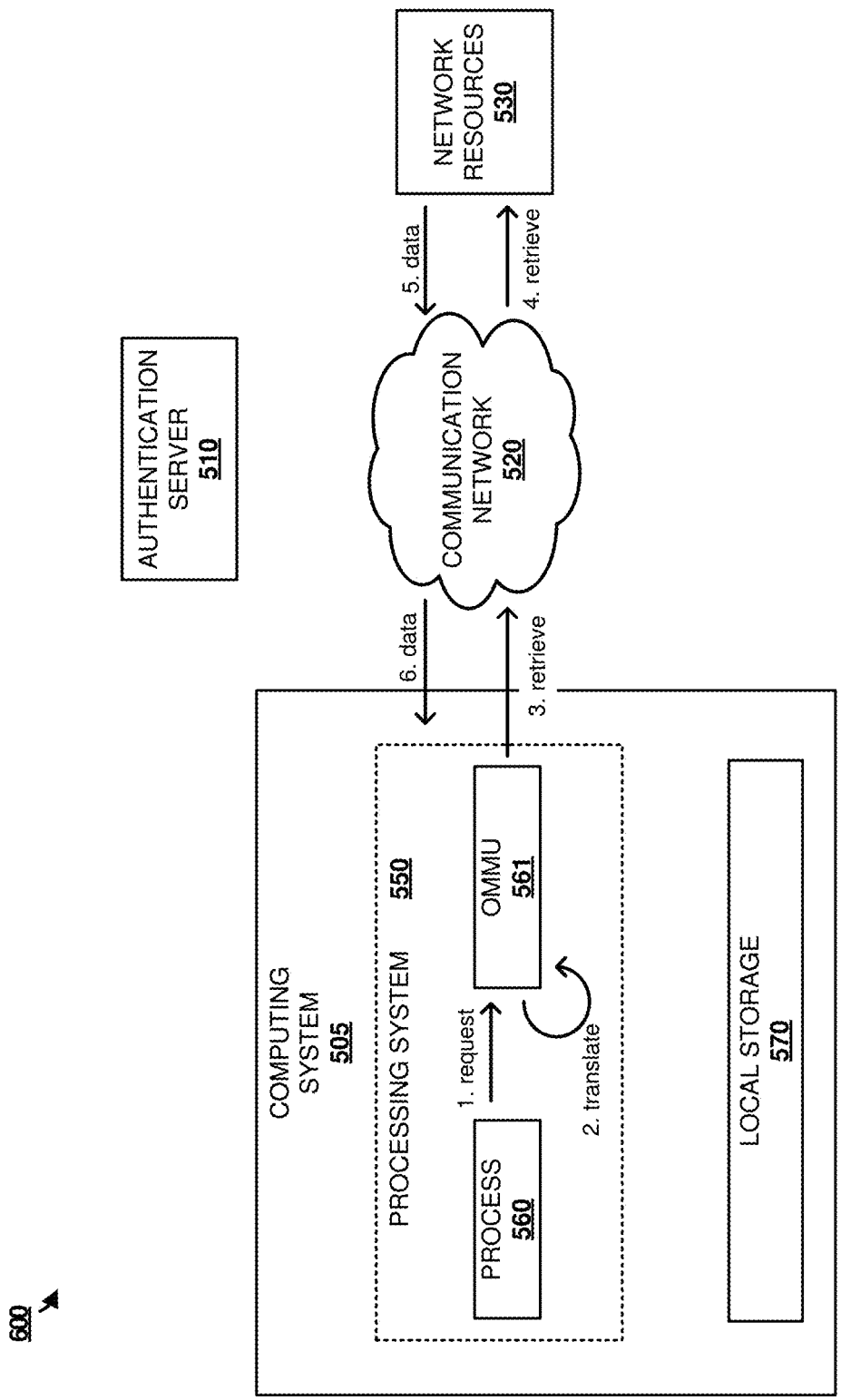
FIG. 6 illustrates an operational scenario of retrieving data using virtual addressing according to one implementation.

Referring now to FIG. 6 as an illustrative example of the operation of computing system 505. FIG. 6 illustrates an operational scenario 600 of retrieving data using virtual addressing according to one implementation. Operational scenario 600 uses systems and elements from communication system 500 of FIG. 5.

As depicted, process 560, which may comprise an application or an operating system, generates a data request using a virtual address, and is identified or received by OMMU 561, at step 1. In response to the data request, OMMU 561 translates, at step 2, the virtual address for the data request based on a mapping of virtual addresses to local and network addresses. Here, OMMU 561 identifies the virtual address supplied by process 560 is directed at a network resource in network resources 530. In response to the identification, OMMU 561 initiates an operation to retrieve, at step 3, the required data from the network resource in network resources 530. Once initiated, the retrieval operation is transferred over communication network 520, where it is received by the network resource, at step 4. In response to the retrieval request, the network resource transfers the requested data, at step 5, over communication network 520 to computing system 505, where it is received and processed by processing system 550.

In some implementations, although not illustrated in the present example, OMMU 561 may cache the data retrieved from the network resource and update the mapping of the virtual addresses accordingly. Thus, if another request was made for the same data, the data may be retrieved from cache memory on computing system 505, such as local storage 570, rather than requesting the networked resource for the data. Although this is one implementation, it should be understood that in some examples the data may not be cached locally on computing system 505, and subsequent requests for the data resource may be again forwarded over communication network 520 to the appropriate destination.

Figure 7:
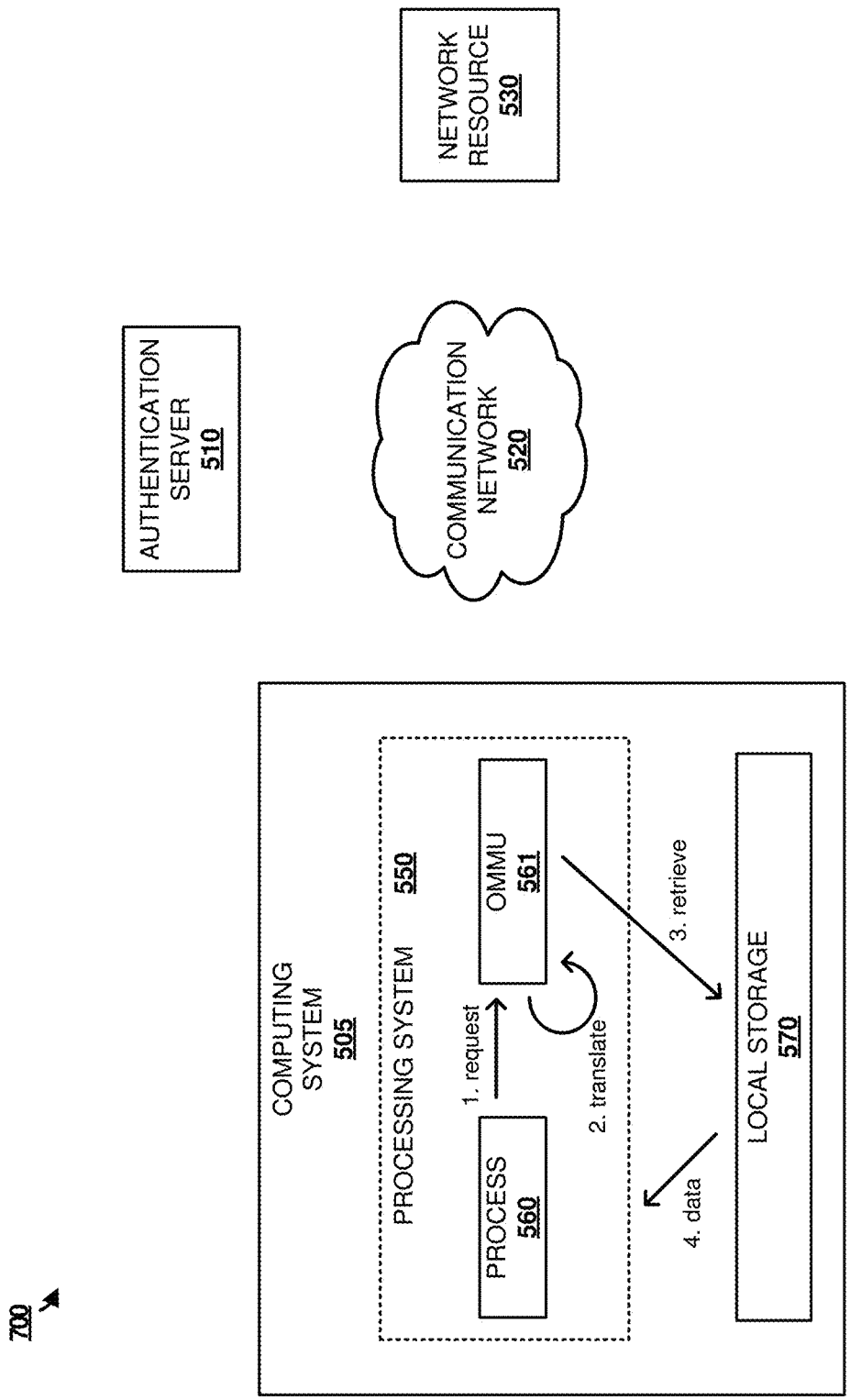
FIG. 7 illustrates an operational scenario of retrieving data using virtual addressing according to one implementation.

FIG. 7 illustrates an operational scenario 700 of retrieving data using virtual addressing according to one implementation. Operational scenario 700 uses systems and elements from communication system 500 of FIG. 5.

Similar to the operations described above with FIG. 5, once the OMMU is configured for computing system 505 using configuration information supplied by network resources, processes may be initiated on processing system 550 that use the virtual addressing space provided by OMMU 561. Here, process 560 is executed by processing system 550 and initiates a data request using a virtual address that is identified for received by OMMU 561 at step 1. In response to identifying the request, OMMU 561 translates the virtual address supplied in the request to one of a local storage address or an external network address. In the present example, the request from process 560 includes a virtual address that is mapped to a local address for a resource in local storage 570. This resource may comprise a page in local DRAM, solid state disk, hard disk, or some other similar storage volume that is local to computing system 505.

Upon identifying the local address, OMMU will direct the request to local storage 570, and provide the data to processing system 550. Although illustrated as a read request in the present example, it should be understood that similar translation operations may be applied to write, copy, and other similar operations. Further, in addition to providing data for processing by processing system 550, OMMU 561 may cache the portion of data retrieved in cache memory for computing system 505. For example, if the data requested were located on solid state or hard disk storage, the object may be mapped or cached in DRAM such that second requests may be provided to the processing system more quickly than if the data remained on the drives. To accommodate this caching, OMMU 561 may update the mapping to the data object to reflect that the object is cached in memory for computing system 505. This may include updating an object table, a page table, or some other table to reflect the cache address for the data object.

Although illustrated in the examples of FIGS. 5-7 with OMMU executing as a process on computing system 505, it should be understood that OMMU may comprise separate hardware capable of providing the same operation. For example, process 560 may operate on the main CPU of computing system 505 while OMMU 561 executes as a separate process, via firmware or software, from a second processing system on computing system 505.

Figure 8:
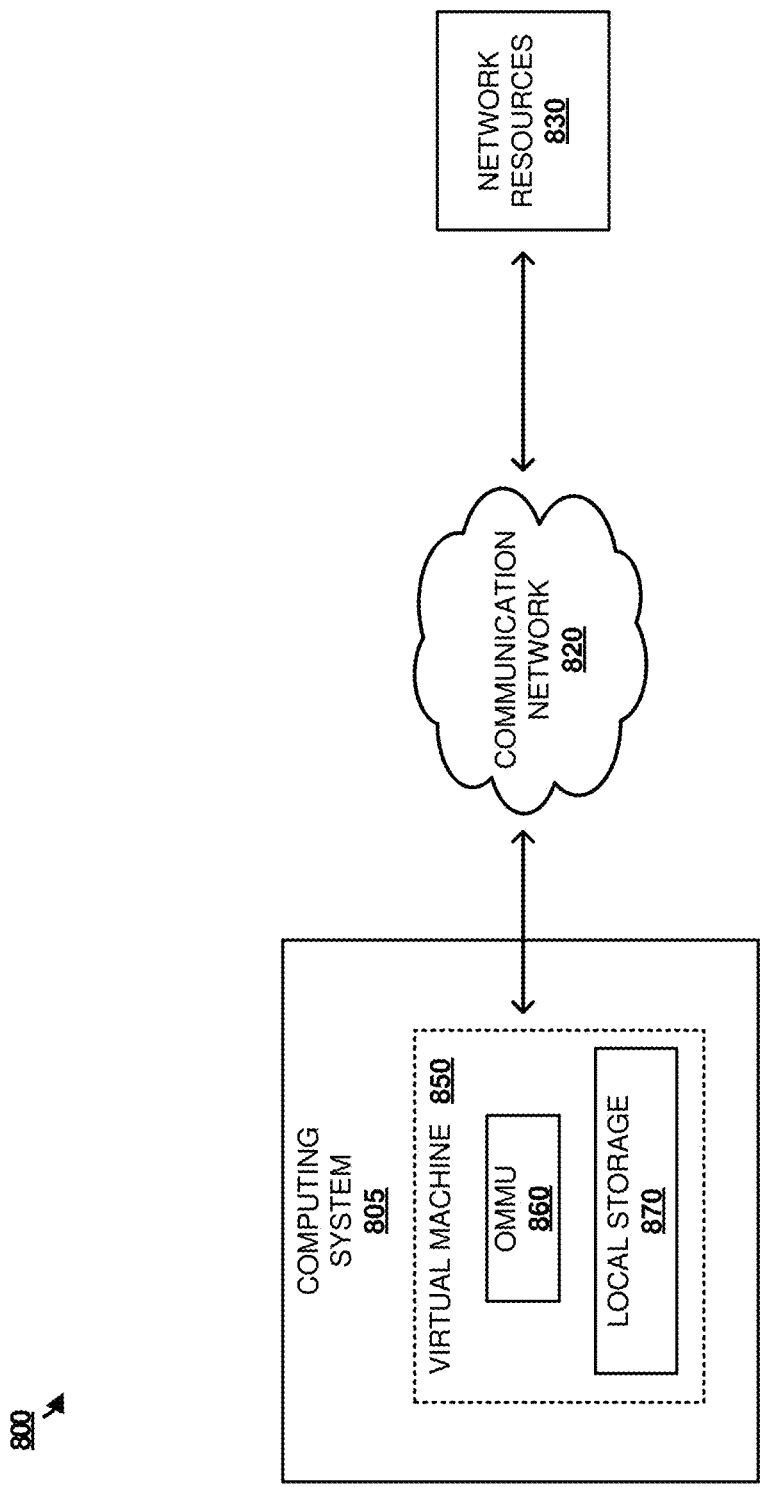
FIG. 8 illustrates an operational scenario of configuring a virtual machine object memory management unit according to one implementation.

FIG. 8 illustrates an operational scenario of configuring a virtual machine object memory management unit according to one implementation. Operational scenario 800 includes computing system 805, communication network 820, and network resources 830. Computing system 805 further includes virtual machine 850 with OMMU 860 and allocated local storage 870 allocated from computing system 805 for virtual machine 850.

In operation, a user or administrator of computing system 805 may request a virtual machine to more efficiently use the resources provided by computing system 805. Rather than installing and loading the appropriate data into the virtual machine, a hypervisor and/or a bootstrap mechanism for virtual machine 850 will transfer a request to an authorization system with credentials for the virtual machine. Once the credentials are received, the authorization system will determine which resources should be provided to the virtual machine, and transfer access information to the virtual machine for the available resources. In the present example, virtual machine 850 is capable of accessing network resources 830, and in response to receiving the access information from the authorization server, virtual machine 850 will request and receive configuration data from network resources 830. This configuration data may be processed by virtual machine 850 to configure OMMU 860. In particular, the configuration data may be processed to generate a mapping for OMMU 860, wherein in the mapping matches virtual addresses for processes on virtual machine 850 to local addresses that address local storage 870 and network addresses that address network resources 830 external to virtual machine 850.

By configuring OMMU 860 with mapping to local and network resources, virtual machine 860 is not required to download all or any of the operating software for virtual machine 850. For example, in providing an operating system to virtual machine 850, OMMU 860 may use virtual addresses mapped to URIs that store the image of the operating system. Accordingly, when a virtual address is received or identified during the operation of virtual machine 850, rather than accessing the data locally, OMMU may permit the accessing of the data from the network resources. In some implementations, in accessing the data over communication network 820, virtual machine 850 may retrieve the data based on OMMU 860 and cache at least a portion of the data in local storage 870. Further, OMMU 860 may update the mapping of the addresses to reflect that a portion of the data is now cached locally in local storage 870.

In some implementations, in addition to the mapping of the virtual addresses to the network addresses, OMMU 860 may also maintain mapping to encryption and other access information for the network resources. In particular, to access network resources 830 in response to a request with a virtual address, OMMU 860 may identify a network address associated with the virtual address and further identify credentials such as an encryption key or passcode to access the data at the network address. Thus, if a page of data were retrieved from network resource 830, the encryption key may be used to process the page of data at virtual machine 850.

Figure 9:
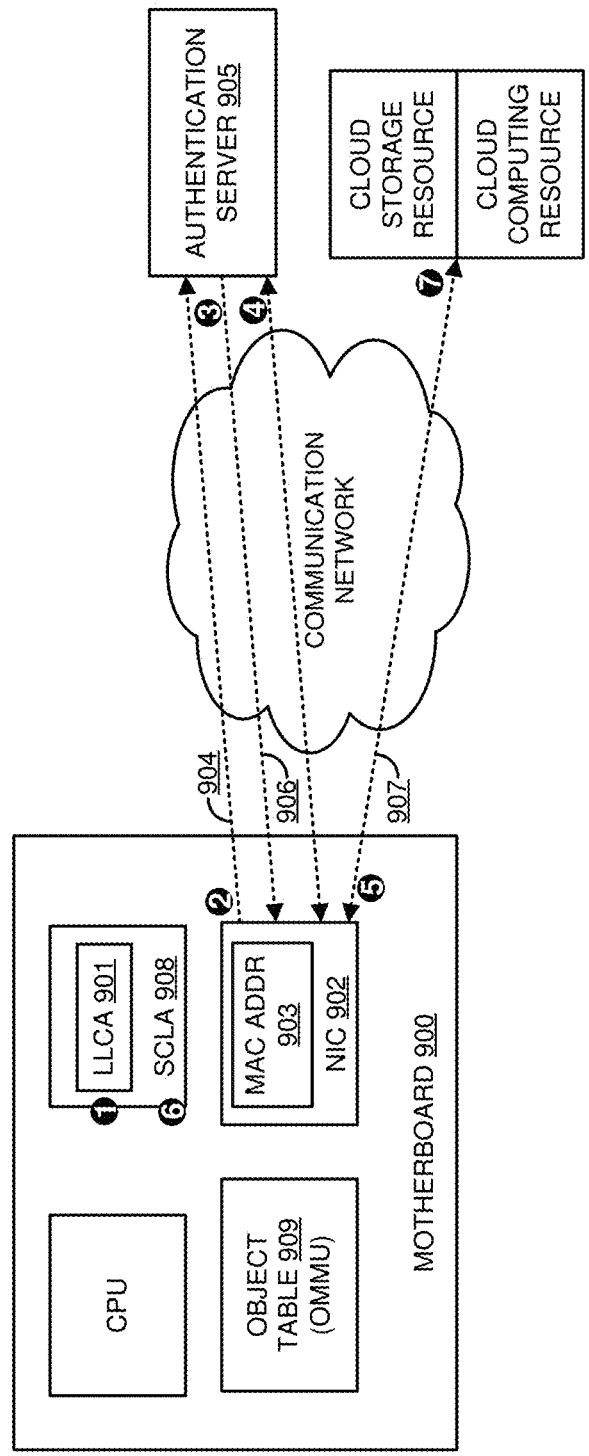
FIG. 9 illustrates an operational scenario of configuring an object memory management unit according to one implementation.

Referring now to FIG. 9, FIG. 9 illustrates an operational scenario of configuring an object memory management unit according to one implementation. The operational scenario demonstrates the use of a ReST-ful interface over HTTPS to configure address mapping for an OMMU. The technique of FIG. 9 leverages the low-level functionality of the platform's network interface controller that supports PXE (i.e., is capable of supporting TCP/IP sockets in an OS-absent environment).

FIG. 9 illustrates an exemplary implementation of a boot process. The process is as follows:

Step 1. When a "motherboard" 900 powers up, a piece of stand-alone software called a low-level client agent (LLCA) 901 is executed as the initial program load (IPL) process. This LLCA 901 may be programmed into the firmware, loaded into the motherboard via a USB drive, loaded from a local disk, or provided any other way.

Step 2. The LLCA 901 will utilize the network interface controller (NIC) 902 device built in or attached to motherboard 900 to send out a HTTPS GET 904 request to an authentication server 905 listening on a pre-determined port address on a specific URL selected by the system administrator. This port address may be changed periodically by the system admin for security purposes. This prevents malicious snooping and tampering that is made possible in a DHCP protocol, by common knowledge that port 67 is the designated DHCP port. In addition, since the request is made using HTTPS GET request, data interchange is secure since HTTPS uses SSL/TLS.

All data generated by the requesting "motherboard" is tagged with the MAC address 903 of the network interface controller (NIC) 902 of the requesting "motherboard" 900 and a time stamp. This provides traceability of all requests that is useful for maintenance, debugging, and security of the network.

Step 3. The authentication server 905 will respond with a challenge 906 to the "motherboard" that generated the HTTPS GET request.

Step 4. Upon receiving a valid response, the authentication server 905 will download the resource addresses (URLs) of a set of trusted URI objects into an object table data structure in the object translation buffer on the OMMU. For systems that do not have a physical OMMU available, the object table data structure may be cached in physical main memory and a software address translation may be employed by the requesting "motherboard."

Step 5. Next the client agent can generate HTTPS GET/SET requests 907 to start data interchange with the authorized URI objects, and download any specific operating system or virtual machine software images required to fully configure the requesting "motherboard" per policy-based protocol.

Step 6. During this data interchange, based on applicable security and privacy policies, the local LLCA 901 is pre-empted by a downloaded system level client agent (SLCA) 908 software module that is matched to the desired operating system. The SLCA 908 then executes the code that sets up the object tables 909 in the OMMU and maps Internet and cloud resources into the physical memory space of the requesting "motherboard."

Step 7. When the SLCA 908 completes its tasks, the desired operating environment comprising all the authorized Internet and cloud resources are available as local resources to the requesting "motherboard."

It should be clear to those practiced in the art that the OMMU apparatus provides a major benefit in this process. Once the OMMU maps a URI object as outlined herein, the data interchange with that URI object may be achieved in a trusted and secure manner by using a representational state transfer (ReST) interface. A ReST interface allows the creation and presentation of complex Internet services in a minimalist way by the use of simple GET, PUT, POST, and DELETE commands over HTTPS, which supports the use of SSL/TLS encryption for all transactions between any two endpoints in a resource address space. Thus, a ReST-ful interface may be employed as an enhanced boot method for a "motherboard" and its constellation of approved and authenticated cloud resources in a given resource address space, and map them into the "motherboard's" local address space in a secure manner.

Figure 10:
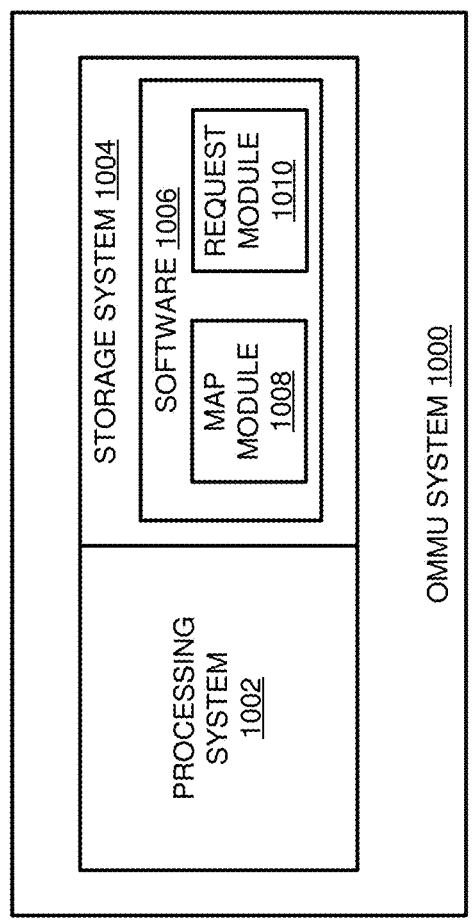
FIG. 10 illustrates an object memory management unit according to one implementation.

FIG. 10 is a block diagram that illustrates an OMMU system in an exemplary implementation. OMMU system 1000 is an example of OMMU 561, although other examples may exist as described herein. OMMU system 1000 includes processing system 1002 and storage system 1004. Storage system 1004 further includes software 1006, which is configured to operate OMMU system 1000 as described herein.

Processing system 1002 may comprise a microprocessor and other circuitry that retrieves and executes software 1006 from storage system 1004. Software 1006 includes map module 1008 and request module 1010. Processing system 1002 may be implemented within a single processing device, but may also be distributed across multiple processing devices or sub-systems that cooperate in executing program instructions. Examples of processing system 1002 include general-purpose central processing units, application specific processors, and logic devices, as well as any other type of processing device. In some implementations, processing system 1002 may comprise the main CPU or CPUs of a computing system, however, in other examples, processing system 1002 may comprise separate hardware within a computing system.

Storage system 1004 may comprise any storage media readable by processing system 1002 and capable of storing software 1006. Storage system 1004 may include volatile and nonvolatile, removable and non-removable media implemented in any method or technology for storage of information, such as computer readable instructions, data structures, program modules, or other data. Storage system 1004 may be implemented as a single storage device, but may also be implemented across multiple storage devices or sub-systems. Storage system 1004 may comprise additional elements, such as a controller to read software 1006 in some examples.

Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In operation, processing system executes software 1006 to provide the desired OMMU operations for a computing system as described herein. In at least one implementation, map module 1008, when read and executed by processing system 1002, directs processing system 1002 to transfer, via a communication interface on the computing system, a request to an authentication server for network configuration resources, and receive access information from the authentication server for at least one network configuration resource. This communication interface may comprise a network interface controller (NIC), a Wi-Fi card, or any other similar network connection device. Once the access information is received, map module 1008 further directs processing system to transfer, via the communication interface of the computing system, a second request to the at least one network configuration resource for OMMU configuration information, and receive the OMMU configuration information from the at least one network configuration resource. The map module further directs processing system 1002 to, based on the OMMU configuration information, generate a mapping of virtual addresses in the computing system to local addresses that address local resources of the computing system and network addresses that address network resources external to the computing system over at least a network. Once mapped, processes on the computing system may use the virtual addressing space to address both local resources of the computing system, such as DRAM and disk storage (solid state and hard disk), as well as network resources that are available via a URI communication path. Thus, although data may be located on a separate computing system, such as a server, desktop, virtual machine, or some other similar device, the processes of the computing system may address the data in the same virtual addressing space as local resources.

In at least one example, once the original generation of the mapping is completed, map module 1008 directs processing system 1002, when executed by processing system 1002, to maintain the mapping of virtual addresses to local addresses and network addresses. This maintenance may include adding, removing, and changing the address mapping as required during the operation of the computing system.

As the mapping is maintained via map module 1008, request module 1010, when executed by processing system 1002, directs processing system 1002 to identify data requests that use the virtual addresses and handle the data requests per the maintained mapping. For example, if a request with a virtual address were mapped to a local address for a local resource, processing system 1002 may access data from the local resource of the computing system. In contrast, if a request with a virtual address were mapped to a network address for a network resource, processing system 1002 may access data in the network resource over the network. The data requests may be generated by the operating system on the host computing system for OMMU system 1000, may be generated by applications executing on the host computing system for OMMU system 1000, or may be generated by any other process on the computing system.

Returning to the elements of FIG. 1, computing system 105 can be a user device, subscriber equipment, customer equipment, access terminal, smartphone, personal digital assistant (PDA), computer, tablet computing device, e-book, Internet appliance, media player, game console, or some other user communication apparatus. Computing system 105 can include communication interfaces, network interfaces, processing systems, computer systems, microprocessors, storage systems, storage media, or some other processing devices or software systems. In some implementations, computing system 105 may represent a virtual machine executing on a host computing system.

Authentication server 110 can include communication interfaces, network interfaces, processing systems, computer systems, microprocessors, storage systems, storage media, or some other processing devices or software systems, and can be distributed among multiple devices. Examples of authentication server 110 can include software such as an operating system, logs, databases, utilities, drivers, natural language processing software, networking software, and other software stored on a computer-readable medium. Authentication server 110 may comprise, in some examples, one or more server computing systems, desktop computing systems, laptop computing systems, or any other computing system, including combinations thereof.

Network resources 130-132 can each include communication interfaces, network interfaces, processing systems, computer systems, microprocessors, storage systems, storage media, or some other processing devices or software systems, and can be distributed among multiple devices. Examples of network resources 130-132 can include software such as an operating system, logs, databases, utilities, drivers, natural language processing software, networking software, and other software stored on a computer-readable medium. Network resources 130-132 may each comprise, in some examples, one or more server computing systems, desktop computing systems, laptop computing systems, or any other computing system, including combinations thereof.

Communication network 120 may comprise switches, wireless access nodes, Internet routers, network gateways, application servers, computer systems, communication links, or some other type of communication equipment—including combinations thereof. Communication network is capable of providing communication services to computing system 105, authentication server 110, and network resources 130-132.

Communication links 150-154 each use metal, glass, optical, air, space, or some other material as the transport media. Communication links 150-154 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 150-154 can each be a direct link or can include intermediate networks, systems, or devices, and can include a logical network link transported over multiple physical links. Although one main link for each of links 150-154 is shown in FIG. 1, it should be understood that links 150-154 are merely illustrative to show communication modes or access pathways. In other examples, further links can be shown, with portions of the further links shared and used for different communication sessions or different content types, among other configurations. Communication links 150-154 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

What is claimed is:

1. An object memory management system configured to map an expanded virtual address space of a computer-implemented system, said expanded virtual address space comprising a virtual address space and a Universal Resource Address Space (URAS), with a physical memory address space local to said computer-implemented system, at least in response to receiving a request from said computer-implemented system, said object memory management system further comprising:

an Object Memory Management Unit (OMMU) configured to:

incorporate said Universal Resource Address Space into said virtual address space, by way of at least virtually integrating a plurality of virtual addresses contained within said virtual address space with a plurality of Universal Resource Indicators (URIs) contained within said Universal Resource Address Space, and thereby create an expanded virtual address space, said expanded virtual address space comprising a unified combination of said plurality of virtual addresses and said plurality of Universal Resource Indicators;

create a mapping between said expanded virtual address space and said physical memory address space local to said computer-implemented system, and thereby simultaneously map each of said virtual addresses to physical addresses contained within said physical memory address space, as well as to Universal Resource Indicators contained within said Universal Resource Address Space, and thereby translate a virtual address into one of a local address and a Universal Resource Indicator, based on said mapping;

said Object Memory Management Unit configured to federate, by virtue of said mapping, said virtual address space, said Universal Resource Address Space, and said physical memory address space, into a virtually unified resource directly accessible to said computer-implemented system via an addressing scheme common to said virtual address space, Universal Resource Address Space and said physical memory address space;

said Object Memory Management Unit, by virtue of said mapping further configured to render said virtual addresses and said Universal Resource Indicators directly accessible on said computer-implemented system via said common addressing scheme, and in a manner equivalent to providing access to said physical memory address space local to said computer-implemented system; and wherein said Object Memory Management Unit is further configured to utilize said Universal Resource Address Space as a trust repository for storing private keys in combination with said Universal Resource Indicators, said private keys executable on at least said Universal Resource Indicators, said Object Memory Management Unit further configured to facilitate at least encryption and decryption of said Universal Resource Indicators via said private keys, and to selectively update said Universal Resource Indicators, into a predetermined object table, as trusted URI objects.

2. The object memory management system as claimed in claim 1, wherein said physical memory address space incorporates physical memory addresses including Random Access Memory addresses and disk-based storage memory addresses.

3. The object memory management system as claimed in claim 1, wherein said Universal Resource Indicators are universal resource addresses representing computing resources remotely accessible to said computer-implemented system, said universal resource addresses in combination constituting said Universal Resource Address Space (URAS).

4. The object memory management system as claimed in claim 1, wherein said Object Memory management unit, by virtue of said mapping between said expanded virtual address space and said physical memory address space, is further configured to facilitate storage of computer-readable information on said virtual addresses and on computing resources accessible via said Universal Resource Indicators, in addition to facilitating storage of said computer readable information on said physical memory address space local to said computer-implemented system.

5. A method executable on an object memory management system for mapping a virtual address space of a computer-implemented system with a Universal Resource Address Space (URAS) remotely accessible via said computer-implemented system, and with a physical memory address space local to said computer-implemented system, at least upon receiving a request from said computer-implemented system, said method comprising the following computer-implemented steps:

incorporating, by an Object Memory Management Unit (OMMU), said Universal Resource Address Space into said virtual address space, by way of at least virtually integrating a plurality of virtual addresses contained within said virtual address space with a plurality of Universal Resource Indicators (URIs) contained within said Universal Resource Address Space, and thereby creating an expanded virtual address space, said expanded virtual address space comprising a unified combination of said plurality of virtual addresses and said plurality of Universal Resource Indicators;

creating, by said Object Memory Management Unit, a mapping between said expanded virtual address space and said physical memory address space local to said computer-implemented system, and thereby simultaneously mapping each of said virtual addresses to physical addresses contained within said physical memory address space, as well as to Universal Resource Indicators contained within said Universal Resource Address Space, and thereby translating a virtual address into one of a local address and a Universal Resource Indicator, based on said mapping;

federating, by said Object Memory Management Unit and by virtue of said mapping, said virtual address space, said Universal Resource Address Space, and said physical memory address space, into a virtually unified resource directly accessible to said computer-implemented system through an addressing scheme common to said virtual address space, Universal Resource Address Space and said physical memory address space;

rendering said Object Memory Management Unit and by virtue of said mapping, said virtual addresses and said Universal Resource Indicators directly accessible on said computer-implemented system via said common addressing scheme and in a manner equivalent to providing access to said physical memory address space local to said computer-implemented system; and configuring said Object Memory Unit to utilize said Universal Resource Address Space as a trust repository for storing private keys in combination with said Universal Resource Indicators, said private keys executable on at least said Universal Resource Indicators, and thereby facilitating at least encryption and decryption of said Universal Resource Indicators, and selective update of said Universal Resource Indicators, into a predetermined object, table as trusted URI objects.

6. The method as claimed in claim 5, wherein the method further includes the step of facilitating storage of computer-readable information on said virtual addresses and on computing resources accessible via said Universal Resource Indicators, in addition to facilitating storage of said computer readable information on said physical memory address space local to said computer-implemented system, by virtue of said mapping between said expanded virtual address space and said physical memory address space.

7. The method as claimed in claim 5, wherein the method further includes the step of translating, by said Object Memory Management Unit, a first request directed to said physical memory address space, to a second request directed to at least one of said virtual memory addresses and said Universal Resource Indicators, based on said mapping between said expanded virtual address space and said physical memory address space.

8. A non-transitory computer-readable storage medium having computer-readable instructions stored thereupon tor mapping a virtual address space of a computer-implemented system with Universal Resource Address Space (URAS) remotely accessible is said computer-implemented system, and with a physical memory address space local to said computer-implemented system, said computer-readable instructions when executed by a processor of said computer-implemented system, cause the processor to:

incorporate said Universal Resource Address Space into said virtual address space, by way of at least virtually integrating a plurality of virtual addresses contained within said virtual address space with a plurality of Universal Resource Indicators (URIs) contained within said Universal Resource Address Space, and thereby create an expanded virtual address space, said expanded virtual address space comprising a unified combination of said plurality of virtual addresses and said plurality of Universal Resource Indicators;

create a mapping between said expanded virtual address space and said physical memory address space local to said computer-implemented system, and thereby simultaneously map each of said virtual addresses to physical addresses contained within said physical memory address space, as well as to Universal Resource indicators contained within said Universal Resource Address Space, and thereby translate a virtual address into one of a local address and a Universal Resource Indicator, based on said mapping;

federate, by virtue of said mapping, said virtual address space, said universal address space, and said physical memory address space, into a virtually unified resource directly accessible to said computer-implemented system via an addressing scheme common to said virtual address space, Universal Resource Address Space and said physical memory address space;

render, by virtue of said mapping, virtual addresses and said Universal Resource Indicators directly accessible on said computer-implemented system via said common addressing scheme, and in a manner equivalent to providing access to said physical memory address space local to said computer-implemented system;

configure said Universal Resource Address Space as a trust repository for storing private keys in combination with said Universal Resource Indicators, said private keys executable on at least said Universal Resource Indicators, and thereby facilitate at least encryption and decryption of said Universal Resource Indicators, and selective updating of said Universal Resource indicators, into a predetermined object table, as trusted URI objects.

9. The computer-readable instructions as claimed in claim 8, wherein the computer-readable instructions when by the processor, further cause the processor to:

facilitate storage of computer readable information said virtual addresses and on computing resources accessible via said Universal Resource Indicators, in addition to facilitating storage of said computer readable information on said physical memory address space local to said computer-implemented system, by virtue of said mapping between said expanded virtual address space and said physical memory address space; and translate a first rest directed to said physical memory address space, to a second request directed to at least one of said virtual memory addresses and said Universal Resource Indicators, based on said mapping between said expanded virtual address space and said physical memory address space.

* * * * *